United States Patent [19]

Estaque

[11] 4,109,979
[45] Aug. 29, 1978

[54] ELASTIC COUPLING

[75] Inventor: André Fernand Estaque, Bagneux, France

[73] Assignee: Societe Anonyme Automobile Citroen, France

[21] Appl. No.: 748,876

[22] Filed: Dec. 9, 1976

[30] Foreign Application Priority Data

Dec. 15, 1975 [FR] France .................. 75 38286

[51] Int. Cl.² .................. F16C 33/22; F16F 1/16
[52] U.S. Cl. .................. 308/238; 267/54 A; 267/57.1 R
[58] Field of Search .................. 308/26, 238, 184 R; 267/54 A, 57.1 R, 57.1 A, 63 R, 63 A

[56] References Cited

U.S. PATENT DOCUMENTS

| | | | |
|---|---|---|---|
| 3,082,999 | 3/1963 | Wolf et al. | 267/63 R |
| 3,924,873 | 12/1975 | Crouch | 267/54 A |
| 4,002,327 | 1/1977 | Damon | 308/238 |

FOREIGN PATENT DOCUMENTS

| | | | |
|---|---|---|---|
| 815,873 | 10/1951 | Fed. Rep. of Germany | 267/54 A |
| 2,205,577 | 10/1972 | Fed. Rep. of Germany | 267/57.1 |

*Primary Examiner*—Trygve M. Blix
*Assistant Examiner*—Charles E. Frankfort
*Attorney, Agent, or Firm*—Weingarten, Maxham & Schurgin

[57] ABSTRACT

An elastic coupling for two elements having non-uniform characteristics of rigidity, the coupling being constituted by two interfitting parts held fast by an elastic sleeve having zones weakened by free spaces made between one part and the sleeve at the ends of the coupling in zones which are symmetrical with respect to a theoretical axis of relative pivoting of the two parts. The invention finds advantageous application in the domain of automobiles.

4 Claims, 6 Drawing Figures

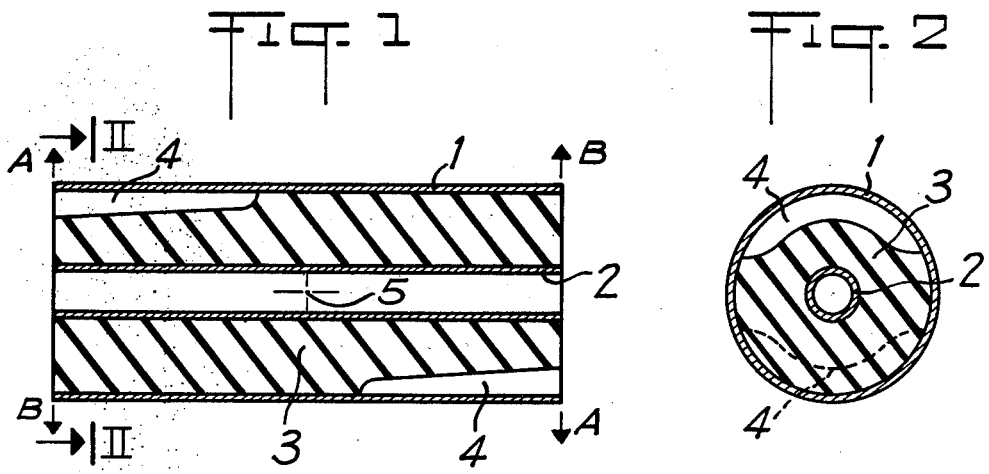
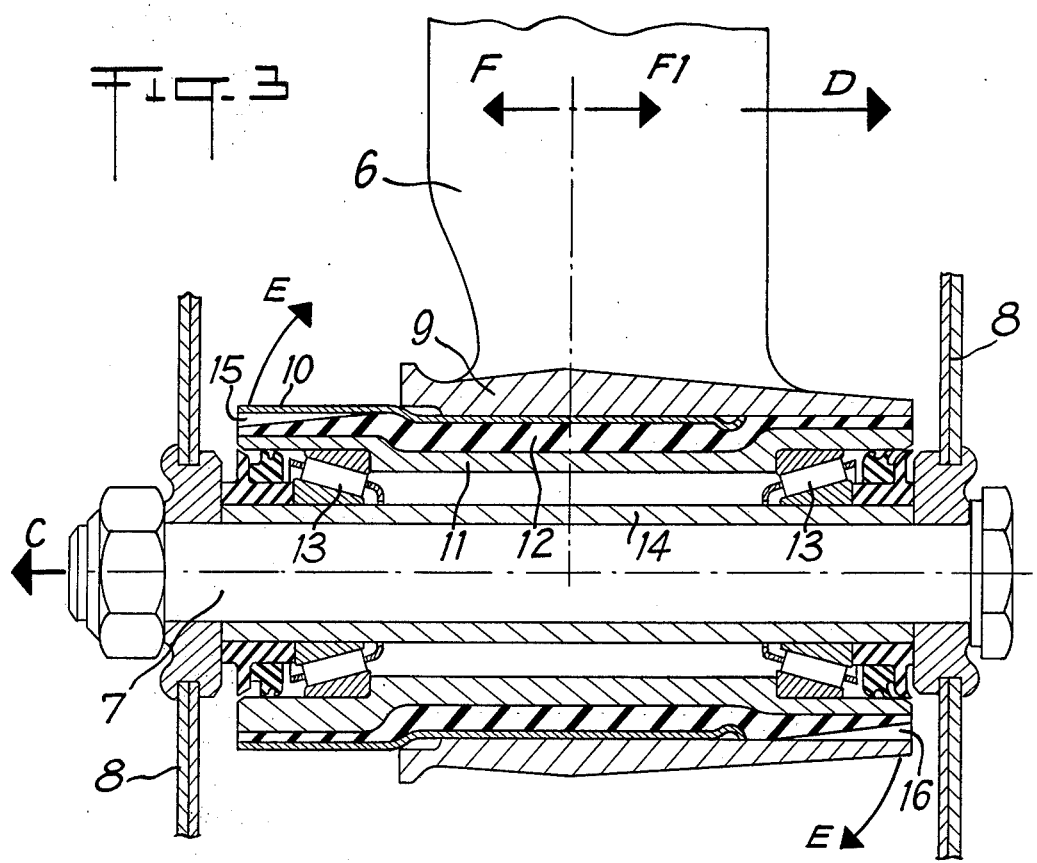

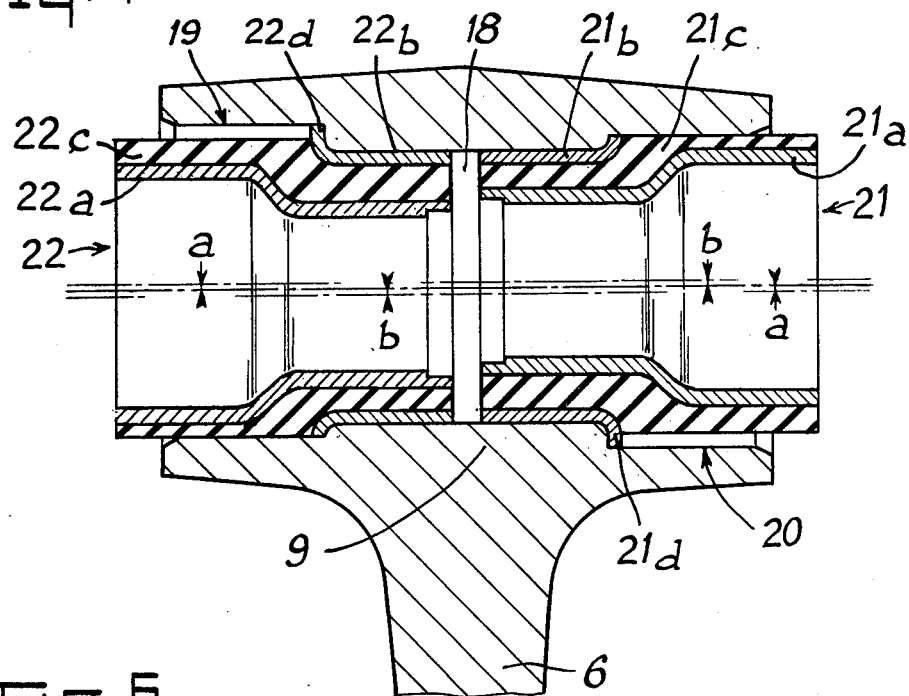
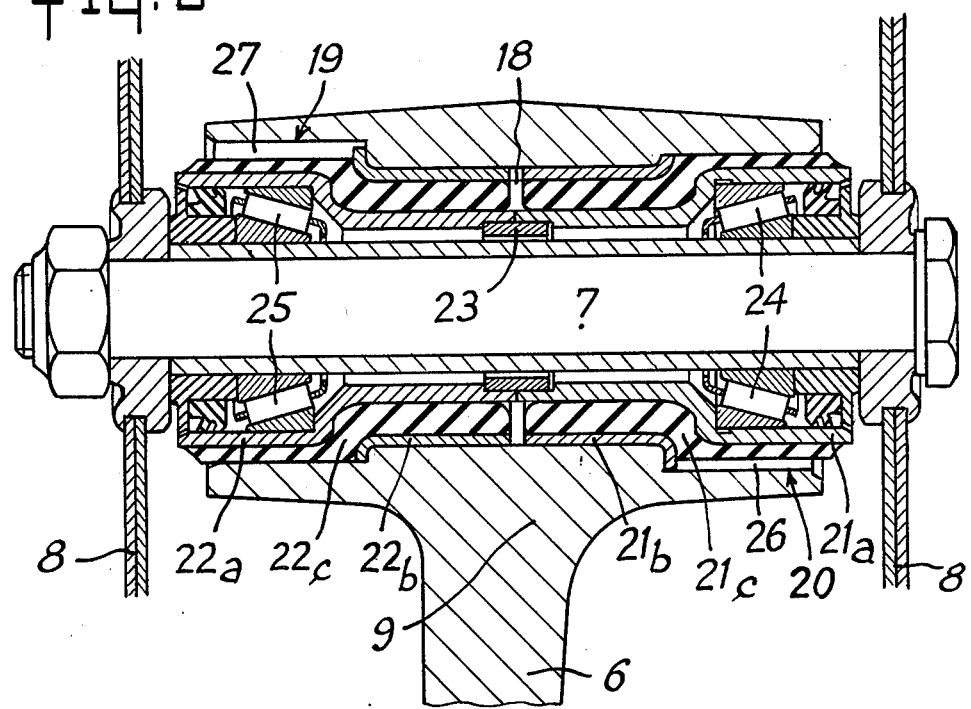

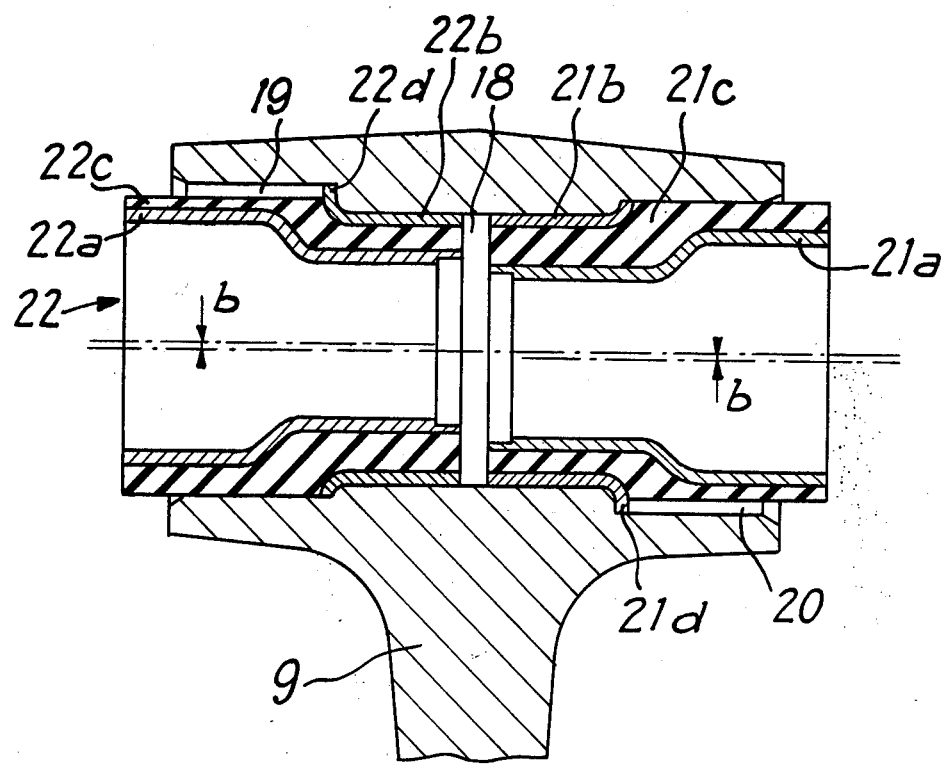

ELASTIC COUPLING

The present invention relates to an elastic coupling for two rigid elements fitted in each other, having different characteristics of rigidity according to the direction of the strains to which these elements are subjected.

Couplings for two interfitted rigid elements between which is interposed an elastic sleeve, are known, which react differently according to whether the stresses are applied thereto in one direction, for which the coupling is very rigid, or in another direction, generally perpendicular to the first, for which the coupling is very flexible. However, these known couplings do not satisfactorily solve the problems raised by alternate torque stresses exerted about a theoretical axis perpendicular to a plane containing the longitudinal axis of the coupling. This problem is very important in such couplings as the front wheel support arm joint on a chassis element of an automobile vehicle. In fact, in certain automobile axle configurations, the or each wheel support arm is pivoted on the chassis about a horizontal axis substantially parallel to the longitudinal axis of the vehicle. In addition, for isolating the connection and damping the oscillations, the hub of the wheel arm is provided with an elastic bearing surface in contact with the pivot pin fast with the body of the hub via an elastic sleeve. Upon deceleration of the vehicle, it is understood that, in the system of force existing between the wheel and the chassis of the vehicle, a torque is developed at the joint of the wheel arm due to the inertia of the vehicle with respect to the wheels.

If the bearing is relatively flexible in the horizontal plane, this torque provokes a relative rotation of the wheel support arm with respect to the chassis and is translated by a movement of the wheel at the end of the arm which tends to alter the geometry of the front axle assembly of the vehicle which, by construction, ensures good steering. This alteration therefore disturbs the safety of steering and the bearing must be rigid against this torque to prevent any movement of the arm with respect to the chassis when the brakes of the vehicle are applied.

However, a bearing which is rigid in this plane has the drawback of easily transmitting oscillations. When the vehicle is apparently maintained at cruising speed, it is in fact subjected to an incessant series of micro-accelerations and micro-decelerations which produce oscillations transmitted to the interior of the vehicle by the elastic wheel arm bearings which are theoretically rigid, this being a cause of discomfort. It is therefore necessary to give the bearing a certain flexibility so that it allows a play for absorbing these oscillations. It is an object of the present invention to reconcile these two opposing requirements of rigidity and flexibility, by proposing an elastic coupling having the advantage of ensuring the comfort of the passengers of an automobile vehicle at the same time as the safety of the steering thereof when the brakes are applied.

To this end, the invention relates to an elastic coupling for two elements with different characteristics of rigidity, said coupling being constituted by two interfitting rigid parts with parallel axes, between which is interposed an elastic connecting sleeve, said parts being subjected to alternate stresses of relative pivoting about a theoretical axis perpendicular to a plane containing their axis. According to the invention, said coupling has two zones of reduced radial rigidity, provided at its axial ends, symmetrical with each other with respect to said theoretical pivot axis, and constituted by free spaces arranged between the outer part and the elastic sleeve.

According to a first embodiment of the invention, the said free spaces are constituted by clearances made in the said sleeve.

In a second embodiment, the said spaces are constituted by recesses made in the outer part.

The elastic sleeve in the coupling according to the second embodiment is advantageously constituted by two half-sleeves, each being provided with an inner recess for housing the inner part which is offset in the free state with respect to its final position in the finished coupling.

The coupling employing the two half-sleeves constitutes a preferred variant embodiment of the invention, in which the said half-sleeves are so disposed in the outer part that their greatest radial thickness is placed on the recess side; the inner part is then force-fitted in the recesses in false alignment thus constituting a pre-compression of the said thick zones.

Finally, the invention relates, by way of application, to an elastic pivot bearing of an arm about a pivot axis, said bearing being constituted by a sheath elastically fast with the arm, which sheath is in two parts about each of which is disposed each half-sleeve mentioned hereinabove; the hub comprises two outer counter-borings oppositely offset with respect to its central bearing surface; each half-sleeve is equipped with an outer ring provided with a flange offset with respect to the body of the ring by the same value as the offsetting of the said counter-borings, the alignment of the two parts of the sheath mounted in the hub being obtained by a floating ring for centering these parts with respect to each other.

The invention will be more readily understood on reading the following description with reference to the accompanying drawings, in which:

FIGS. 1 and 2 show schematic views of a first embodiment of the coupling according to the invention;

FIG. 3 is an industrial illustration of FIGS. 1 and 2;

FIGS. 4 and 5 are views of two variant embodiments of a fixed bearing according to the invention before the pivot pin is placed in position.

FIG. 6 is a view of the bearing of FIGS. 4 and 5 equipped with the pivot pin.

Referring now to the drawings, FIG. 1 and FIG. 2, which is a view in section along II-II of FIG. 1, show two rigid parts 1 and 2, shown in the present case in the form of coaxial bushes fitted in each other and held fast by means of an elastic sleeve 3 generally disposed therebetween without stress. This sleeve has at each of its ends a lunular clearance 4. These clearances are symmetrical with respect to a theoretical axis 5 perpendicular to the plane of FIG. 1 about which bush 1 may rotate with respect to bush 2. The bush 2 is assumed to be fixed and there is applied to bush 1 a torque A acting in the plane of the Figure. This torque tends to cause the bush 1 to rotate about the theoretical axis 5. This rotation is countered by the sleeve 3, all the more so as the sleeve opposes, against the bush 1, solid parts which directly transmit the force to the fixed bush 2. For this direction of rotation, the coupling is therefore very rigid.

If on the other hand a torque B contained in the plane of the Figure is applied to bush 1, the sleeve 3 offers only a low resistance to the rotation about the axis 5 of the bush 1, in view of the clearances 4 which it comprises. This result in a possible pivoting of the bush 1 with respect to the bush 2 and, for this direction of rotation, the elastic coupling is extremely supple.

FIG. 3 shows these schematic diagrams as an elastic bearing. This bearing is that of a support arm 6 for example of an automobile vehicle hub pivoted about a pin 7 carried by elements 8 fast with the chassis of this vehicle. This bearing is housed in the hub 9 of the arm 6 and comprises an outer bush 10, an inner bush 11 and an elastic sleeve 12 extending therebetween. The inner bush 11 cooperates with the pivot pin 7 via bearings 13 and a lining 14. By these supports, it therefore possesses the rigidity of the pin 7. The outer bush 10 is fast with the bore of the hub 9, in which it is introduced over at least a part of its length. The elastic sleeve 12 is forced between the two bushes. It has recesses 15 and 16 similar to those (4) defined with reference to FIGS. 1 and 2.

The compression of the sleeve is considerable in the zones radially opposite the clearances 15 and 16, either between the two bushes 10 and 11 opposite clearance 15, or between the bush 11 and the bore of the hub 9 opposite clearance 16.

It will be assumed that the vehicle provided with this joint is advancing in the direction of arrow C. A force D is created on the arm 6, in the case of braking, said force being due to the adherence of the braked wheel on the ground. This force D, combined with the inertia of the vehicle which acts in direction C, creates a torque at the elastic bearing. The bush 10 therefore tends to pivot with respect to the bush 11 in the direction of arrow E. This pivoting is then immediately countered by the parts of the strongly compressed sleeve 12 opposite the recesses 15 and 16. The bearing being very rigid in this direction, there is no possible displacement of the wheel plane with respect to the longitudinal axis of the vehicle. In the case of the front axle assembly, this results in the geometry of construction and therefore the safety of steering being conserved.

If on the other hand the arm 6 is subjected to alternating stresses such as F, F1 corresponding to the microaccelerations and decelerations occurring during regular running, the stresses of type F1 are withstood by the bearing, since, for their direction, the bearing is rigid, whilst the movements produced by the stresses of type F are absorbed by the bearing since, in view of clearances 15 and 16, the bearing is supple and absorbs these deformations. The oscillations of arm 6 are now only partly transmitted to the chassis of the vehicle, this being sufficient to eliminate any longitudinal vibrations of the interior and to maintain the comfort of the passengers.

FIGS. 4 and 5 show two advantageous embodiments of the invention, particularly concerning the production of the parts constituting it and their assembly. They show an incomplete elastic bearing before the pivot pin is mounted in this bearing. The joint of an axle support arm on a chassis element will also be considered. The arm will therefore be with its hub 9 in which is housed the elastic bearing. This hub 9 comprises a central bore 18 and two counter-borings 19 and 20 made at each of the ends of the bore 18. The counter-boring 19 is upwardly offset by $a$ with respect to the bore 18 and counter-boring 20 is offset by $a$ with respect to the bore 18, opposite the offsetting of 19, so that the offsetting of 19 with respect to 20 is twice $a$. The elastic bearing is itself constituted by two identical half-bearings 21 and 22. Each comprises a half-sheath 21a, 22a, an outer ring 21b, 22b and an elastic half-sleeve 21c and 22c. By construction of the elastic half-sleeves, the half-sheaths 21a and 22a are offset by a value $b$ with respect to the rings 21b and 22b. Finally, the outer rings 21b and 22b comprise a flange 21d and 22d, whose diameter is slightly smaller than the diameter of the counter-borings 19 and 20 and is offset with respect to the outer surface of said rings.

In FIG. 4, the thick part of the half-sleeves is disposed opposite the largest dimension of said flanges.

On the contrary, in FIG. 5, the thick part of the half-sleeves is disposed opposite the smallest dimensions of said flanges. In this way, there is a false alignment of the half-sheaths 21a and 22a by a value equal to twice $b$, in the same direction as the off-setting of the counter-borings 19 and 20 in the case of FIG. 4 and in an opposite direction for FIG. 5. The flanges 21d and 22d serve as means for centering the sleeves and sheaths on the ring and of the half-bearings 21 and 22 in the hub 9.

FIG. 6 shows the elements of FIGS. 4 and 5, mounted, with the same references. In order to correct the false alignment of the half-bearings 21 and 22, there is a floating ring 23, on which is borne the end inside the bore of the hub of the half-sheaths 21a and 22a provided with an adequate shoulder. The pivot pin 7 and the bearings 24 and 25 may therefore be more easily placed in position.

By this re-alignment of the half-bearings, pre-stresses are created in modulated manner in the half-sleeves 21c and 22c enabling a more stable bearing to be obtained which is better adapted to the function for which it is intended. It will be noted that the offsetting of the counterborings 19 and 20 constitutes free spaces 26 and 27, which will allow the sought after pivoting of the arm 6 with respect to the pin 7. In these embodiments, the desired effects are very advantageously obtained without resorting the manufacture of special parts of complicated shape, but on the contrary by means of a judicious assembly of parts which are simple to manufacture.

The invention finds advantageous application in the domain of the mechanical couplings in automobile vehicles.

What is claimed is:

1. An elastic coupling for two elements with different characteristics of rigidity, said coupling comprising: two interfitting inner and outer parts with parallel axes, between which parts is interposed an elastic connective sleeve, said inner and outer parts being subjected to alternate stresses of relative pivoting about a theoretical axis perpendicular to a plane containing their axis, wherein said coupling has two zones of reduced radial rigidity provided at its axial ends, said zones being symmetrical with each other with respect to the theoretical pivot axis and being constituted by free spaces arranged between said outer part and said elastic sleeve, said free spaces resulting from recesses being formed in said outer part, said elastic sleeve being constituted by two half-sleeves, each being provided with an inner recess for housing said inner part which is offset in the free state with respect to its final position in the finished coupling, wherein said half-sleeves are so disposed in said outer part that their greatest radial thickness constituting thick zones are placed on the free spaces side and said inner part is force fitted in the recesses in false alignment thus constituting a precompression of said thick zones.

2. Elastic pivot bearing housed within a hub on an axle support arm of a vehicle on a chassis element of the vehicle, comprising a pivot pin fast with said chassis element mounted to rotate in a sheath elastically fast with said support arm employing said elastic coupling as recited in claim 1, wherein said inner part constitutes said sheath and said outer part is said hub, said sheath being formed of two parts about each of which is disposed each said half-sleeve, said hub comprising two outer counter-borings oppositely offset with respect to its central bearing surface, each said half-sleeve being equipped with an outer ring provided with a flange offset with respect to the body of said ring by the same value as the offsetting of said counter-borings the alignment of said two parts of said sheath mounted in said hub being obtained by a floating ring for centering said parts with respect to each other.

3. An elastic coupling for two elements with different characteristics of rigidity, said coupling comprising: two interfitting inner and outer parts with parallel axes, between which parts is interposed an elastic connecting sleeve, said inner and outer parts being subjected to alternate stresses of relative pivoting about a theoretical axis perpendicular to a plane containing their axis, wherein said coupling has two zones of reduced radial rigidity provided at its axial ends, said zones being symmetrical with each other with respect to the theoretical pivot axis and being constituted by free spaces arranged between said outer part and said elastic sleeve, said free spaces resulting from recesses being formed in said outer part, said elastic sleeve being constituted by two half-sleeves, each being provided with an inner recess for housing said inner part which is offset in the free state with respect to its final position in the finished coupling, wherein said half-sleeves are so disposed in said outer part that their smallest radial thickness is placed on the free spaces side and said inner part is force fitted in the recesses in false alignment thus constituting a precompression of the greatest radial thickness.

4. Elastic pivot bearing housed within a hub on an axle support arm of a vehicle on a chassis element of the vehicle, comprising a pivot pin fast with said chassis element mounted to rotate in a sheath elastically fast with said support arm employing said elastic coupling as recited in claim 3, wherein said inner part constitutes said sheath and said outer part is said hub, said sheath being formed of two parts about each of which is disposed each said half-sleeve, said hub comprising two outer counter-borings oppositely offset with respect to its central bearing surface, each said half-sleeve being equipped with an outer ring provided with a flange offset with respect to the body of said ring by the same value as the offsetting of said counter-borings, the alignment of said two parts of said sheath mounted in said hub being obtained by a floating ring for centering said parts with respect to each other.

* * * * *